United States Patent
Hu et al.

(10) Patent No.: US 11,678,187 B2
(45) Date of Patent: Jun. 13, 2023

(54) METHOD FOR RESTRICTING ACCESS OF TERMINAL DEVICE AND APPARATUS

(71) Applicant: HUAWEI TECHNOLOGIES CO., LTD., Guangdong (CN)

(72) Inventors: Li Hu, Shanghai (CN); Jing Chen, Shanghai (CN); Kai Pan, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/089,216

(22) Filed: Nov. 4, 2020

(65) Prior Publication Data

US 2021/0058789 A1 Feb. 25, 2021

Related U.S. Application Data

(63) Continuation of application No. PCT/CN2019/089137, filed on May 29, 2019.

(30) Foreign Application Priority Data

Jun. 13, 2018 (CN) ........................ 201810609145.X

(51) Int. Cl.
- *H04W 12/08* (2021.01)
- *H04W 12/71* (2021.01)
- *H04W 48/02* (2009.01)
- *H04L 9/06* (2006.01)

(52) U.S. Cl.
CPC .......... *H04W 12/08* (2013.01); *H04W 12/71* (2021.01); *H04W 48/02* (2013.01); *H04L 9/0643* (2013.01)

(58) Field of Classification Search
CPC ...... H04W 12/08; H04W 12/71; H04W 48/02
USPC ........................................................ 455/410
See application file for complete search history.

(56) References Cited

U.S. PATENT DOCUMENTS

| | | | | |
|---|---|---|---|---|
| 7,693,530 | B1* | 4/2010 | McKinney | H04W 48/02 455/26.1 |
| 10,230,522 | B1* | 3/2019 | Roths | H04W 76/10 |
| 2011/0199898 | A1 | 8/2011 | Cho et al. | |
| 2012/0166652 | A1* | 6/2012 | Bouthemy | H04L 65/1094 709/227 |
| 2016/0285914 | A1* | 9/2016 | Singh | G06F 21/00 |

(Continued)

FOREIGN PATENT DOCUMENTS

| CN | 101400106 A | 4/2009 |
|---|---|---|
| CN | 102404821 A | 4/2012 |

(Continued)

*Primary Examiner* — Joel Ajayi
(74) *Attorney, Agent, or Firm* — Womble Bond Dickinson (US) LLP

(57) ABSTRACT

This application provides a method for restricting access of a terminal device, and an apparatus. The method includes: receiving, by an access network device, a first identifier that is from a terminal device, where the first identifier is used to identify the terminal device; and if the first identifier matches a second identifier, restricting, by the access network device, access of the terminal device, where the second identifier is used to identify a terminal device having abnormal behavior. Based on the solution, the access network device pre-records the second identifier of the terminal device having the abnormal behavior.

20 Claims, 6 Drawing Sheets

(56) References Cited

U.S. PATENT DOCUMENTS

2017/0063854 A1* 3/2017 Kaladgi .............. G06F 21/6218
2018/0041536 A1* 2/2018 Berlin .................... G06F 21/56

FOREIGN PATENT DOCUMENTS

CN 106576286 A 4/2017
GB 2458102 A 9/2009

* cited by examiner

US 11,678,187 B2

METHOD FOR RESTRICTING ACCESS OF TERMINAL DEVICE AND APPARATUS

CROSS-REFERENCE TO RELATED APPLICATIONS

This application is a continuation of International Application No. PCT/CN2019/089137, filed on May 29, 2019, which claims priority to Chinese Patent Application No. 201810609145.X, filed on Jun. 13, 2018. The disclosures of the aforementioned applications are hereby incorporated by reference in their entireties.

TECHNICAL FIELD

This application relates to the field of mobile communications technologies, and in particular, to a method for restricting access of a terminal device, and an apparatus.

BACKGROUND

In some service scenarios, some terminal devices usually have simple functions and poor security protection, and are vulnerable to be attacked and controlled by an attacker. An example of an attack is that the attacker may use virus software to quickly control a large quantity of terminal devices, to form a botnet controlled by the attacker. When a scale for the attacker to control the terminal devices reaches a specific degree, the attacker may control the terminal devices to simultaneously initiate a large quantity of connections to a server. Consequently, the server is overloaded and breaks down, and a denial-of-service (DoS) attack is caused.

Therefore, how to effectively control an attack from a terminal device is a problem to be resolved.

SUMMARY

This application provides a method for restricting access of a terminal device, and an apparatus, to effectively control an attack from a terminal device.

According to a first aspect, this application provides a method for restricting access of a terminal device. The method includes: An access network device receives a first identifier that is from a first terminal device. The first identifier is used to identify the terminal device. If the first identifier matches a second identifier, the access network device restricts access of the first terminal device. The second identifier is used to identify a terminal device having abnormal behavior. Based on the solution, the access network device pre-records the second identifier of the terminal device having the abnormal behavior. When there is a first terminal device sending the first identifier to the access network device to request to establish a connection or request to resume a connection, the access network device first determines, based on the first identifier, whether the first identifier matches the second identifier recorded by the access network device. If the first identifier matches the second identifier, it indicates that the first terminal device corresponding to the first identifier is the terminal device having the abnormal behavior. Therefore, the access network device restricts access of the first terminal device, so as to effectively control an attack from the terminal device.

The abnormal behavior that occurs on the terminal device herein may include, for example, a signaling anomaly, a traffic anomaly, or a service anomaly that occurs on the terminal device. The signaling anomaly may include a signaling behavior anomaly, a terminal location anomaly, a signaling parameter anomaly, and the like. The traffic anomaly may include a traffic content anomaly, a traffic feature anomaly, an access object anomaly, a protocol application anomaly, and the like. The service anomaly may include a voice short message service anomaly, a multimedia message anomaly, a package anomaly, and the like.

In an embodiment, the access network device may further perform matching between the first identifier and second identifier. For example, the matching may be performed between the first identifier and the second identifier by using the following method, but the method is not limited to the following method:

Embodiment method 1: The access network device performs matching between the first identifier and the second identifier.

In the 4th generation (4G) communications, the first identifier is a globally unique temporary identity (GUTI), and the second identifier is a GUTI; or the first identifier is an S-TMSI, and the second identifier is a system architecture evolution temporary mobile station identifier (S-TMSI); or the first identifier is a hash value of a GUTI, and the second identifier is a hash value of the GUTI; or the first identifier is a hash value of an S-TMSI, and the second identifier is a hash value of the S-TMSI.

In the 5th generation (5G) communications, the first identifier is a 5G-globally unique temporary identity (5G-GUTI), and the second identifier is a 5G-GUTI; or the first identifier is a 5G-system architecture evolution temporary mobile station identifier (5G-S-TMSI), and the second identifier is a 5G-S-TMSI; or the first identifier is a hash value of a 5G-GUTI, and the second identifier is a hash value of the 5G-GUTI; or the first identifier is a hash value of a 5G-S-TMSI, and the second identifier is a hash value of the 5G-S-TMSI.

Embodiment method 2: The access network device determines a third identifier of the terminal device based on the second identifier; and the access network device performs matching between the first identifier and the third identifier.

In the 4G communications, the first identifier is an S-TMSI, the second identifier is a GUTI, and the third identifier is an S-TMSI; or the first identifier is a hash value of a GUTI, the second identifier is the GUTI, and the third identifier is a hash value of the GUTI; or the first identifier is a hash value of an S-TMSI, the second identifier is the S-TMSI, and the third identifier is a hash value of the S-TMSI. Alternatively, the first identifier is an S-TMSI, the second identifier is an eNB UE S1AP ID or an MME UE S1AP ID, and the third identifier is an S-TMSI.

The eNB is short for an evolved NodeB in 4G, the UE is short for user equipment (user equipment), the S1AP is short for the S1 application protocol, the ID is short for an identification, and the MME is short for a mobility management entity.

In the 5G communications, the first identifier is a 5G-S-TMSI, the second identifier is a 5G-GUTI, and the third identifier is a 5G-S-TMSI; or the first identifier is a hash value of a 5G-GUTI, the second identifier is the 5G-GUTI, and the third identifier is a hash value of the 5G-GUTI; or the first identifier is a hash value of a 5G-S-TMSI, the second identifier is the 5G-S-TMSI, and the third identifier is a hash value of the 5G-S-TMSI. Alternatively, the first identifier is a 5G-S-TMSI, the second identifier is a gNB UE N2AP ID or an AMF UE N2AP ID, and the third identifier is a 5G-S-TMSI.

The gNB is short for a next generation NodeB, the N2AP is short for the N2 application protocol, and the AMF is short for an access and mobility management function.

Embodiment method 3: The access network device determines a fourth identifier of the first terminal device based on the first identifier; and the access network device performs matching between the fourth identifier and the second identifier.

In the 4G communications, the first identifier is a GUTI, the second identifier is an S-TMSI, and the fourth identifier is an S-TMSI; or the first identifier is an S-TMSI, the second identifier is a hash value of the S-TMSI, and the fourth identifier is a hash value of the S-TMSI; or the first identifier is a GUTI, the second identifier is a hash value of the GUTI, and the fourth identifier is a hash value of the GUTI.

In the 5G communications, the first identifier is a 5G-GUTI, the second identifier is a 5G-S-TMSI, and the fourth identifier is a 5G-S-TMSI; or the first identifier is a 5G-S-TMSI, the second identifier is a hash value of the 5G-S-TMSI, and the fourth identifier is a hash value of the 5G-S-TMSI; or the first identifier is a 5G-GUTI, the second identifier is a hash value of the 5G-GUTI, and the fourth identifier is a hash value of the 5G-GUTI.

Embodiment method 4: The access network device determines a fifth identifier of the first terminal device based on the first identifier, and determines a sixth identifier of the terminal device based on the second identifier; and the access network device performs matching between the fifth identifier and the sixth identifier.

In the 4G communications, the first identifier is an S-TMSI, the fifth identifier is a hash value of the S-TMSI, the second identifier is a GUTI, and the sixth identifier is a hash value of the S-TMSI; or the first identifier is an S-TMSI, the fifth identifier is a hash value of the S-TMSI, the second identifier is an eNB UE S1AP ID or an MME UE S1AP ID, and the sixth identifier is a hash value of the S-TMSI.

In the 5G communications, the first identifier is a 5G-S-TMSI, the fifth identifier is a hash value of the 5G-S-TMSI, the second identifier is a 5G-GUTI, and the sixth identifier is a hash value of the 5G-S-TMSI; or the first identifier is a 5G-S-TMSI, the fifth identifier is a hash value of the 5G-S-TMSI, the second identifier is a gNB UE N2AP ID or an AMF UE N2AP ID, and the sixth identifier is a hash value of the 5G-S-TMSI.

In an embodiment, before the access network device performs matching between the first identifier and the second identifier, the access network device may further receive the second identifier that is from a security function network element.

In an embodiment, after the access network device receives the second identifier that is from the security function network element, the access network device may further start a timer. That the access network device restricts access of the first terminal device specifically includes: If the timer does not time out, the access network device restricts the access of the first terminal device. Based on the solution, before the timer times out, the access network device restricts terminal devices having abnormal behavior, and after the timer times out, the access network device no longer restricts the terminal devices. This helps avoid a case in which the terminal devices still cannot access to access devices after the terminal devices are restored to normal.

In an embodiment, after the access network device receives the second identifier that is from the security function network element and before the access network device receives the first identifier that is from the first terminal device, the access network device may further release a connection to the terminal device. Based on the solution, for a terminal device having abnormal behavior, when the terminal device is currently in a connected state, the access network device may release a connection to the terminal device, to reduce load of the access network device. This helps prevent the terminal device having the abnormal behavior from attacking the access network device.

In an embodiment, that the access network device receives the second identifier that is from the security function network element specifically includes: The access network device receives a first message that is from the security function network element. The first message includes the second identifier, and the first message is used to indicate that the terminal device is a terminal device whose access needs to be restricted.

In an embodiment, that the access network device receives the second identifier that is from the security function network element specifically includes: The access network device receives the second identifier and indication information that are from the security function network element. The indication information is used to indicate that the terminal device is a terminal device whose access needs to be restricted.

In an embodiment, after restricting the access of the first terminal device, the access network device may further send a cause value to the first terminal device. The cause value is used to indicate that a reason for restricting the access of the first terminal device is a security reason.

According to a second aspect, this application provides a method for restricting access of a terminal device. The method includes: An access network device receives a first identifier that is from a terminal device. The first identifier is used to identify the terminal device. The access network device obtains a context of the terminal device based on the first identifier. If the context of the terminal device includes a restriction indication, the access network device restricts access of the terminal device. The restriction indication is used to indicate that the terminal device is a terminal device whose access needs to be restricted. Based on the solution, if a terminal device has abnormal behavior, the access network device may record the restriction indication in the context of the terminal device. The restriction indication is used to indicate that the terminal device is a terminal device whose access needs to be restricted. In this way, if there is a terminal device subsequently sending the first identifier to the access network device, for example, a terminal device in an inactive state sends the first identifier to the access network device, to request to resume a connection, the access network device may obtain the context of the terminal device based on the first identifier. If the context of the terminal device includes the restriction indication, it indicates that the terminal device is a terminal device whose access needs to be restricted. Therefore, the access network device may restrict access of the terminal device. In this way, an attack from the terminal device having the abnormal behavior is effectively controlled. Certainly, if the context of the terminal device does not include the restriction indication, it indicates that the terminal device is a normal terminal device, and the access network device may not perform an operation of restricting the access of the terminal device.

In an embodiment, the access network device receives a second identifier that is from a security function network element. The second identifier is used to identify the terminal device having the abnormal behavior. The access network device adds the restriction indication to the context of the terminal device based on the second identifier.

In an embodiment, after the access network device receives the second identifier that is from the security function network element, the access network device may further start a timer. That the access network device restricts access of the terminal device includes: If the timer does not time out, the access network device restricts the access of the terminal device. Based on the solution, before the timer times out, the access network device restricts terminal devices having abnormal behavior, and after the timer times out, the access network device no longer restricts the terminal devices. This helps avoid a case in which the terminal devices still cannot access to access devices after the terminal devices are restored to normal.

In an embodiment, that the access network device receives the second identifier that is from the security function network element includes: The access network device receives a first message that is from the security function network element. The first message includes the second identifier, and the first message is used to indicate that the terminal device is a terminal device whose access needs to be restricted.

In an embodiment, that the access network device receives the second identifier that is from the security function network element includes: The access network device receives the second identifier and indication information that are from the security function network element. The indication information is used to indicate that the terminal device is a terminal device whose access needs to be restricted.

In an embodiment, the access network device sends a cause value to the first terminal device. The cause value is used to indicate that a reason for restricting the access of the first terminal device is a security reason.

According to a third aspect, this application provides a method for restricting access of a terminal device. The method includes: A terminal device sends a first identifier of the terminal device to an access network device. The first identifier is used to identify the terminal device. The terminal device receives a reject message that is from the access network device. The reject message includes a cause value, and the cause value is used to indicate that a reason for restricting access of the terminal device is a security reason. Based on the solution, if the terminal device is a terminal having abnormal behavior, the access network device may restrict the access of the terminal device for the security reason. In this way, an attack from the terminal device having the abnormal behavior is effectively controlled.

In an embodiment, the terminal device attempts to access the network again after waiting for specified duration based on the cause value.

According to a fourth aspect, this application provides a method for restricting access of a terminal device. The method includes: A security function network element determines, based on traffic data of a terminal device, whether the terminal device has abnormal behavior. The security function network element sends a second identifier of the terminal device to an access network device. The second identifier is used to identify the terminal device. Based on the solution, when determining that the terminal device has the abnormal behavior, the security function network element sends the second identifier of the terminal device to the access network device, so that the access network device may restrict access of the terminal device based on the second identifier. In this way, an attack from the terminal device having the abnormal behavior is effectively controlled.

The traffic data herein may include control plane traffic or feature data of the terminal device, user plane traffic or feature data of the terminal device, and the like.

In an embodiment, that the security function network element sends a second identifier of the terminal device to an access network device includes: The security function network element sends a first message to the access network device. The first message includes the second identifier, and the first message is used to indicate that the terminal device is a terminal device whose access needs to be restricted.

In an embodiment, that the security function network element sends a second identifier of the terminal device to an access network device includes: The security function network element sends the second identifier and indication information to the access network device. The indication information is used to indicate that the terminal device is a terminal device whose access needs to be restricted.

According to a fifth aspect, this application provides an apparatus. The apparatus may be an access network device, a terminal device, a security function network element, or a chip. The apparatus has a function of implementing embodiments of any one of the first aspect, the second aspect, the third aspect, or the fourth aspect. The function may be implemented by hardware, or may be implemented by hardware by executing corresponding software. The hardware or the software includes one or more modules corresponding to the foregoing function.

According to a sixth aspect, an apparatus is provided, including a processor and a memory. The memory is configured to store a computer executable instruction. When the apparatus runs, the processor executes the computer executable instruction stored in the memory, so that the apparatus performs the method for restricting access of a terminal device according to the first aspect or any one of the embodiments of the first aspect, or performs the method for restricting access of a terminal device according to the second aspect or any one of the embodiments of the second aspect, or performs the method for restricting access of a terminal device according to the third aspect or any one of the embodiments of the third aspect, or performs the method for restricting access of a terminal device according to the fourth aspect or any one of the embodiments of the fourth aspect.

According to a seventh aspect, this application further provides a computer-readable storage medium. The computer-readable storage medium stores an instruction; and when the instruction is run on a computer, the computer is enabled to perform the method according to the foregoing aspects.

According to an eighth aspect, this application further provides a computer program product including an instruction; and when the computer program product runs on a computer, the computer is enabled to perform the method according to the foregoing aspects.

According to a ninth aspect, this application further provides a system. The system includes the access network device in the first aspect or any one of the embodiments of the first aspect, and the security function network element in the fourth aspect or any one of the embodiments of the fourth aspect. Further, the system may further include the terminal device in the third aspect or any one of the embodiments of the third aspect.

According to a tenth aspect, this application further provides a system. The system includes the access network device in the second aspect or any one of the embodiments of the second aspect, and the security function network element in the fourth aspect or any one of the embodiments of the fourth aspect. Further, the system may further include the terminal device in the third aspect or any one of the embodiments of the third aspect.

Such aspects or other aspects of this application are clearer and more comprehensible in descriptions of the following embodiments.

DESCRIPTION OF EMBODIMENTS

To make objectives, technical solutions, and advantages of this application clearer, the following further describes this application in detail with reference to the accompanying drawings. A specific operation method in method embodiments may also be applied to an apparatus embodiment or a system embodiment. In the descriptions of this application, unless otherwise stated, "a plurality of" means two or more than two.

The network architecture and the service scenario described in the embodiments of this application are intended to describe the technical solutions in the embodiments of this application more clearly, but constitute no limitation on the technical solutions provided in the embodiments of this application. Persons of ordinary skill in the art may learn that the technical solutions provided in the embodiments of this application are also applicable to a similar technical problem as the network architecture evolves and a new service scenario emerges.

Figure 1:
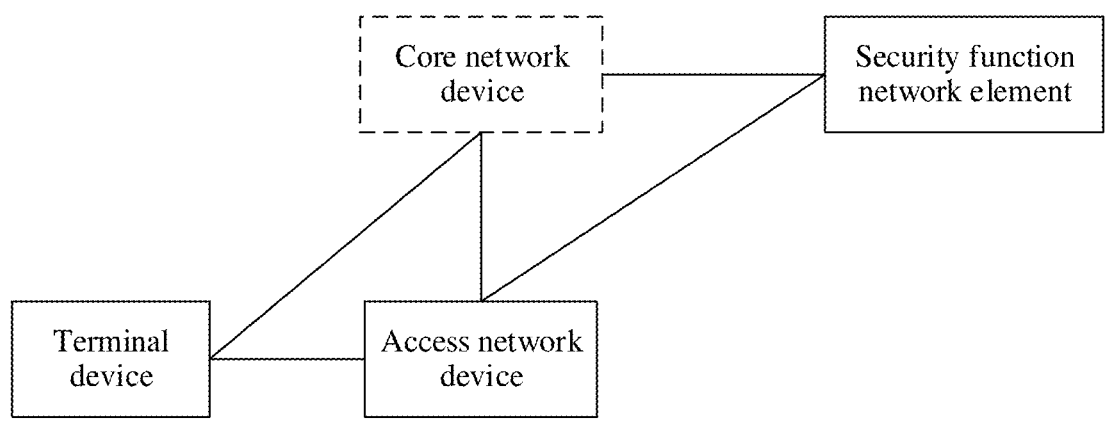
FIG. 1 is a schematic diagram of a network architecture according to this application.

FIG. 1 is a schematic diagram of a network architecture to which this application is applicable. The network architecture includes a terminal device, an access network device, and a security function network element. Certainly, the network architecture may further include a core network device.

The terminal device is a device that has a wireless transceiver function, and the terminal device may be deployed on the land, including an indoor or outdoor device, a hand-held device, or a vehicle-mounted device, or may be deployed on the water (for example, on a ship), or may be deployed in the air (for example, on a plane, a balloon, or a satellite). The terminal device may be a mobile phone, a tablet (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

The access network device is a device that provides a wireless communication function for the terminal device. For example, the access network device includes but is not limited to: a next generation NodeB (gNB) in 5G, an evolved NodeB (eNB) in 4G, a radio network controller (RNC), a NodeB (NB), a base station controller (BSC), a base transceiver station (BTS), a home base station (for example, a home evolved nodeB, or a home node B, HNB), a baseband unit (BBU), a transmission reception point (TRP), a transmission point (TP), a mobile switching center, and the like.

The core network device in this application may be, for example, an AMF network element in the 5G, or may be an MME in the 4G. The AMF network element has an access and mobility management function, is a termination point of non-access stratum (NAS) signaling, and is responsible for functions such as access authentication and mobility management. The MME is a termination point of the NAS signaling, and is responsible for functions such as access authentication, mobility management, and session management.

The security function network element in this application has a security function, and may analyze traffic data of the terminal device to find malicious traffic, that is, find a terminal device having abnormal behavior. In an embodiment, in the 5G, the security function network element may be integrated into a network data analysis function (NWDAF) entity, or integrated into an operation, administration, and maintenance (OAM) entity, or an application function (AF) entity. In the 4G, the security function network element may be integrated into an application server (AS).

The OAM entity may also be referred to as a network management system, and is configured to provide a group of network management functions, including fault monitoring, fault reporting, fault diagnosis, fault rectification, and the like.

The NWDAF entity is configured to provide a big data analysis service. The entity may collect data from a 3GPP network, and perform big data analysis, so as to provide a better policy.

The AF entity is configured to provide an application service, and the application service may be provided by a third party or an operator.

The AS is configured to provide an application service, and the application service may be provided by a third party or an operator.

It may be understood that the foregoing functions may be network elements in a hardware device, software functions running on dedicated hardware, or virtualized functions instantiated on a platform (for example, a cloud platform).

The following specifically describes, with reference to the accompanying drawings, the method for restricting access of a terminal device provided in this application.

Figure 2:
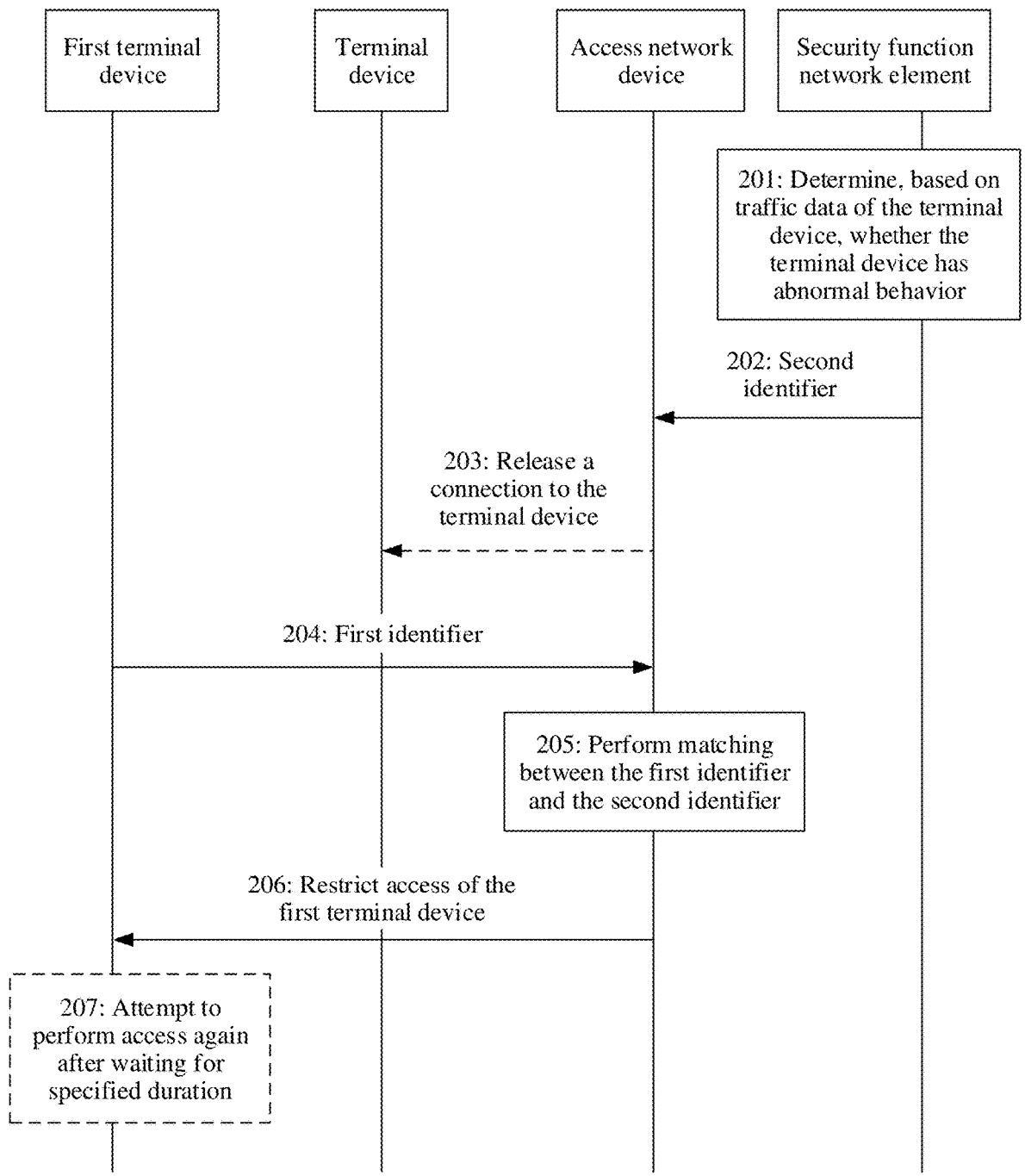
FIG. 2 is a flowchart of a method for restricting access of a terminal device according to this application.

FIG. 2 shows a method for restricting access of a terminal device according to this application. The method includes the following operations.

Operation 201: A security function network element determines, based on traffic data of a terminal device, whether the terminal device has abnormal behavior.

The traffic data may include control plane traffic or feature data of the terminal device, user plane traffic or feature data of the terminal device, and the like.

The abnormal behavior that occurs on the terminal device may include, for example, a signaling anomaly, a traffic anomaly, or a service anomaly that occurs on the terminal device. The signaling anomaly may include a signaling behavior anomaly, a terminal location anomaly, a signaling parameter anomaly, and the like. The traffic anomaly may include a traffic content anomaly, a traffic feature anomaly, an access object anomaly, a protocol application anomaly, and the like. The service anomaly may include a voice short message service anomaly, a multimedia message anomaly, a package anomaly, and the like.

Operation 202: The security function network element sends a second identifier of the terminal device to an access network device, where the second identifier is used to identify the terminal device having the abnormal behavior. Correspondingly, the access network device may receive the second identifier.

For example, the following provides two embodiment methods in which the security function network element sends the second identifier to the access network device.

Embodiment method 1: The security function network element sends a first message to the access network device, where the first message includes the second identifier, and the first message is used to indicate that the terminal device is a terminal device whose access needs to be restricted.

In other words, the first message has an indication function, and is specifically used to indicate that the terminal device identified by the second identifier that is in the first message is a terminal device whose access needs to be restricted.

The first message herein may also be referred to as a notification message or the like. A specific name of the message is not limited in this application.

Embodiment method 2: The security function network element sends the second identifier and indication information to the access network device, where the indication information is used to indicate that the terminal device is a terminal device whose access needs to be restricted.

For example, the second identifier and the indication information may be carried in a same message and sent to the access network device, or may be separately carried in two messages and sent to the access network device.

In embodiment method 2, one piece of additional indication information is used to indicate that the terminal device is a terminal device whose access needs to be restricted.

After receiving the second identifier, the access network device may store the second identifier. For example, the second identifier may be stored, in a form of a list, in a storage space of the access network device or in a storage space other than the access network device, for example, in a unified data management (UDM) network element.

The following uses a list-based storage mode as an example for description. Table 1 shows identifiers that are of terminal devices whose access needs to be restricted and that are stored in the access network device.

TABLE 1

| Second identifier of a terminal device whose access needs to be restricted |
|---|
| UE ID 1 |
| UE ID 2 |
| UE ID 3 |
| . . . |

It should be noted that the second identifier in this application is used to identify the terminal device having the abnormal behavior. Therefore, an identifier that is of any terminal device whose access needs to be restricted and that is recorded by the access network device may be referred to as the second identifier. As shown in Table 1, each of the UE ID 1, the UE ID 2, and the UE ID 3 may be referred to as the second identifier, and terminal devices respectively identified by the UE ID 1, the UE ID 2, and the UE ID 3 are terminal devices whose access needs to be restricted.

In this application, the second identifier may include but is not limited to the following embodiments:

In 4G, the second identifier may be an S-TMSI, a hash value of an S-TMSI, a GUTI, a hash value of a GUTI, an eNB UE S1AP ID, or an MME UE S1AP ID.

In 5G, the second identifier may be a 5G-S-TMSI, a hash value of a 5G-S-TMSI, a 5G-GUTI, a hash value of a 5G-GUTI, a gNB UE N2AP ID, or an AMF UE N2AP ID.

Certainly, in future communications, for example, the 6th generation (6G) communications, the second identifier may alternatively be another identifier. This is not limited in this application.

It should be noted that operation 202 may also be replaced with the following operation 202A and operation 202B.

Operation 202A: The security function network element sends a second identifier of the terminal device to a core network device, where the second identifier is used to identify the terminal device having the abnormal behavior. Correspondingly, the core network device may receive the second identifier.

The core network device may be an AMF network element or an MME.

Operation 202B: The core network device sends the second identifier of the terminal device to the access network device. Correspondingly, the access network device may receive the second identifier.

Operation 203: The access network device releases a connection to the terminal device. Operation 203 is an optional operation.

For example, when the terminal device whose access needs to be restricted is a terminal device in a connected state, the access network device may release the connection to the terminal device by performing operation 203, so as to reduce load of the access network device.

For another example, when the terminal device whose access needs to be restricted is a terminal device in an inactive state, the access network device may release the connection to the terminal device by performing operation 203, so as to reduce load of the access network device.

For another example, when the terminal device whose access needs to be restricted is a terminal device in an inactive state, the access network device may alternatively not perform operation 203.

In the 5G, the inactive state is introduced. When a terminal device enters the inactive state from the connected state, a base station suspends the terminal device. In this case, the terminal device and the access network device delete some access stratum (AS) contexts, and retain some AS contexts, such as an access stratum key (which may be referred to as a KgNB in the 5G), a security capability of the terminal device, and security algorithms (including an integrity protection algorithm and an encryption algorithm) for communication between the terminal device and a source base station accessed by the terminal device. When the terminal device is in the inactive state, because some AS contexts are retained on the terminal device, the terminal enters the connected state from the inactive state more quickly than the terminal device enters the connected state from an idle state.

Herein, if the access network device determines to release the connection to the terminal device, any one of the following methods may be used:

Method 1: If the second identifier is any one of the S-TMSI, the 5G-S-TMSI, the GUTI, the 5G-GUTI, the gNB UE N2AP ID, the AMF UE N2AP ID, the eNB UE S1AP ID, or the MME UE S1AP ID, the terminal device identified by the second identifier may be determined based on the second identifier, and then the connection to the terminal device is released.

Method 2: If the second identifier is the S-TMSI or the GUTI, the access network device may further receive the eNB UE S1AP ID or the MME UE S1AP ID, then determine, based on the eNB UE S1AP ID or the MME UE S1AP ID, the terminal device identified by the second identifier, and then release the connection to the terminal device. If the second identifier is the 5G-S-TMSI or the 5G-GUTI, the access network device may further receive the gNB UE N2AP ID or the AMF UE N2AP ID, then determine, based on the gNB UE N2AP ID or the AMF UE N2AP ID, the terminal device identified by the second identifier, and then release the connection to the terminal device.

By performing operation 201 and operation 202, or performing operation 201 to operation 203, the security function network element may determine terminal devices having abnormal behavior, and send second identifiers of the terminal devices to the access network device. The access network device stores the second identifiers of the terminal devices. Therefore, when a terminal device, for example, a first terminal device, subsequently requests to establish a connection to the access network device, the access network device may determine, based on the stored second identifiers, whether the first terminal device is a terminal device whose access needs to be restricted, and determine, based on a determining result, whether to restrict access of the terminal device. In this way, access of a terminal device having abnormal behavior can be restricted.

The following describes in detail a process in which the first terminal device requests access. It should be noted that the first terminal device herein may be a terminal device in the terminal devices identified by the second identifiers stored in the access network device, or may not be any terminal device in the terminal devices identified by the second identifiers stored in the access network device.

Operation 204: The first terminal device sends a first identifier of the first terminal device to the access network device, where the first identifier is used to identify the first terminal device. Correspondingly, the access network device may receive the first identifier.

The first terminal device herein may be a terminal device in the idle state or a terminal device in the inactive state.

When the first terminal device is a terminal device in the idle state, operation 204 may be implemented by using the following method: The first terminal device sends a first request message to the access network device. The first request message includes the first identifier of the first terminal device, and the first request message is used to request to establish a radio resource control (RRC) connection. The first request message may also be referred to as a request message, or referred to as a connection establishment request message, or may have another name.

When the first terminal device is a terminal device in the inactive state, operation 204 may be implemented by using the following method: The first terminal device sends a second request message to the access network device. The second request message includes the first identifier of the first terminal device, and the second request message is used to request to resume an RRC connection. The second request message may also be referred to as a request message, or referred to as a connection resume request message, or may have another name.

Operation 205: The access network device performs matching between the first identifier and the second identifier.

"Matching" herein means that the terminal device indicated by the first identifier is the same as the terminal device indicated by the second identifier.

If the first identifier matches the second identifier, it indicates that the first terminal device is a terminal device whose access needs to be restricted, and operation 206 is performed.

If the first identifier does not match the second identifier, it indicates that the first terminal is not a terminal device whose access needs to be restricted, that is, the first terminal device is a normal terminal device, and the access network device may not restrict access of the first terminal device. Therefore, a connection to the first terminal device may be established.

The following describes several embodiment methods for performing matching between the first identifier and the second identifier.

Embodiment method 1: The access network device performs matching between the first identifier and the second identifier.

In the 4G communications, the first identifier is a GUTI, and the second identifier is a GUTI; or the first identifier is an S-TMSI, and the second identifier is an S-TMSI; or the first identifier is a hash value of a GUTI, and the second identifier is a hash value of the GUTI; or the first identifier is a hash value of an S-TMSI, and the second identifier is a hash value of the S-TMSI.

In the 5G communications, the first identifier is a 5G-GUTI, and the second identifier is a 5G-GUTI; or the first identifier is a 5G-S-TMSI, and the second identifier is a 5G-S-TMSI; or the first identifier is a hash value of a 5G-GUTI, and the second identifier is a hash value of the 5G-GUTI; or the first identifier is a hash value of a 5G-S-TMSI, and the second identifier is a hash value of the 5G-S-TMSI.

Embodiment method 2: The access network device determines a third identifier of the terminal device based on the second identifier; and the access network device performs matching between the first identifier and the third identifier.

In the 4G communications, the first identifier is an S-TMSI, the second identifier is a GUTI, and the third identifier is an S-TMSI; or the first identifier is a hash value of a GUTI, the second identifier is the GUTI, and the third identifier is a hash value of the GUTI; or the first identifier is a hash value of an S-TMSI, the second identifier is the S-TMSI, and the third identifier is a hash value of the S-TMSI. Alternatively, the first identifier is an S-TMSI, the second identifier is an eNB UE S1AP ID or an MME UE S1AP ID, and the third identifier is an S-TMSI.

In the 5G communications, the first identifier is a 5G-S-TMSI, the second identifier is a 5G-GUTI, and the third identifier is a 5G-S-TMSI; or the first identifier is a hash value of a 5G-GUTI, the second identifier is the 5G-GUTI, and the third identifier is a hash value of the 5G-GUTI; or the first identifier is a hash value of a 5G-S-TMSI, the second identifier is the 5G-S-TMSI, and the third identifier is a hash value of the 5G-S-TMSI. Alternatively, the first identifier is a 5G-S-TMSI, the second identifier is a gNB UE N2AP ID or an AMF UE N2AP ID, and the third identifier is a 5G-S-TMSI.

Embodiment method 3: The access network device determines a fourth identifier of the first terminal device based on the first identifier; and the access network device performs matching between the fourth identifier and the second identifier.

In the 4G communications, the first identifier is a GUTI, the second identifier is an S-TMSI, and the fourth identifier is an S-TMSI; or the first identifier is an S-TMSI, the second identifier is a hash value of the S-TMSI, and the fourth identifier is a hash value of the S-TMSI; or the first identifier is a GUTI, the second identifier is a hash value of the GUTI, and the fourth identifier is a hash value of the GUTI.

In the 5G communications, the first identifier is a 5G-GUTI, the second identifier is a 5G-S-TMSI, and the fourth identifier is a 5G-S-TMSI; or the first identifier is a 5G-S-TMSI, the second identifier is a hash value of the 5G-S-TMSI, and the fourth identifier is a hash value of the 5G-S-TMSI; or the first identifier is a 5G-GUTI, the second identifier is a hash value of the 5G-GUTI, and the fourth identifier is a hash value of the 5G-GUTI.

Embodiment method 4: The access network device determines a fifth identifier of the first terminal device based on the first identifier, and determines a sixth identifier of the terminal device based on the second identifier; and the access network device performs matching between the fifth identifier and the sixth identifier.

In the 4G communications, the first identifier is an S-TMSI, the fifth identifier is a hash value of the S-TMSI, the second identifier is a GUTI, and the sixth identifier is a hash value of the S-TMSI; or the first identifier is an S-TMSI, the fifth identifier is a hash value of the S-TMSI, the second identifier is an eNB UE S1AP ID or an MME UE S1AP ID, and the sixth identifier is a hash value of the S-TMSI.

In the 5G communications, the first identifier is a 5G-S-TMSI, the fifth identifier is a hash value of the 5G-S-TMSI, the second identifier is a 5G-GUTI, and the sixth identifier is a hash value of the 5G-S-TMSI; or the first identifier is a 5G-S-TMSI, the fifth identifier is a hash value of the 5G-S-TMSI, the second identifier is a gNB UE N2AP ID or an AMF UE N2AP ID, and the sixth identifier is a hash value of the 5G-S-TMSI.

Operation 206: The access network device restricts the access of the first terminal device.

In an embodiment, that the access network device restricts the access of the first terminal device may be the following: The access network device sends a reject message to the first terminal device. The reject message is used to reject the access of the first terminal device. in an embodiment, the reject message may further include a cause value, and the cause value is used to indicate that a reason for restricting the access of the first terminal device is a security reason.

In an embodiment, that the access network device restricts the access of the first terminal device may alternatively be the following: The access network device does not perform a subsequent operation. To be specific, the access network device neither sends the reject message to the first terminal device nor establishes the connection to the first terminal device, so that the first terminal device cannot access the access network device, thereby restricting the access of the first terminal device.

In an embodiment, after operation 203, the method may further include the following operation 207.

Operation 207: The first terminal device attempts to perform access again after waiting for specified duration.

For example, when the reject message includes the cause value, and the cause value is the security reason, the first terminal device may attempt to perform access again after waiting for the specified duration based on the cause value.

The specified duration may be sent by the access network device to the first terminal device by performing operation 206, or may be set by the first terminal device.

The access attempt means that the first terminal device directly initiates a connection establishment or resume request to the first access device. Alternatively, the access attempt means that the first terminal device randomly generates a value from 0 to 1. If the value is less than a preset value (the preset value may be sent by the access network device to the first terminal device by performing operation 206 or preset by the first terminal device), the first terminal device initiates a connection establishment or resume request to the first access device. If the value is greater than or equal to the preset value, no connection establishment or resume request is initiated.

According to the foregoing method, the access network device pre-records the second identifier of the terminal device having the abnormal behavior. When there is a first terminal device sending the first identifier to the access network device to request to establish a connection or request to resume a connection, the access network device first determines, based on the first identifier, whether the first identifier matches the second identifier recorded by the access network device. If the first identifier matches the second identifier, it indicates that the first terminal device corresponding to the first identifier is the terminal device having the abnormal behavior. Therefore, the access network device restricts access of the first terminal device, so as to effectively control an attack from the terminal device.

In an embodiment, in operation 202, if the security function network element sends a plurality of second identifiers to the access network device in a form of a list, after receiving the second identifiers, the access network device may further start a timer. The timer is specific to terminal devices identified by all the second identifiers in the list. The timer is configured to indicate duration for restricting the terminal devices identified by the second identifiers. For example, if the security function network element sends the list shown in Table 1 to the access network device, and the list includes the UE ID 1, the UE ID 2, and the UE ID 3, the timer is configured to indicate duration for restricting terminal devices identified by the UE ID 1, the UE ID 2, and the UE ID 3. In other words, before the timer times out, if any one of the terminal devices identified by the second identifiers sends a request for accessing the core network device to the access network device, the core network device restricts access of the terminal device.

In an embodiment, in operation 202, if the security function network element sends a plurality of second identifiers to the access network device in a form of a list or separately sends second identifiers to the access network device, after receiving the second identifiers, the access network device may further start a timer for each second identifier. The timer is specific to the terminal device identified by the second identifier. The timer is configured to indicate duration for restricting the terminal device identified by the second identifier. For example, after receiving the UE ID 1, the access network device starts a first timer for the terminal device identified by the UE ID 1; after receiving the UE ID 2, the access network device starts a second timer for the terminal device identified by the UE ID 2; and after receiving the UE ID 3, the access network device starts a third timer for the terminal device identified by the UE ID 3. Each timer is configured to indicate duration for restricting one terminal device. In other words, before the first timer times out, if the terminal device identified by the UE ID 1 sends a request for accessing the core network device to the access network device, the core network device restricts access of the terminal device. Before the second timer times out, if the terminal device identified by the UE ID 2 sends a request for accessing the core network device to the access network device, the core network device restricts access of the terminal device. Before the third timer times out, if the terminal device identified by the UE ID 3 sends a request for accessing the core network device to the access network device, the core network device restricts access of the terminal device.

In an embodiment, alternatively, after determining that the first identifier does not match the second identifier in operation 205, the access network device may start a timer for the first terminal device, where the timer is used to indicate duration for restricting the access of the first terminal device.

It should be noted that the duration of any one of the foregoing timers may be set by the access network device, or may be specified by the security function network element for the access network device. This is not limited in this application.

Figure 3:
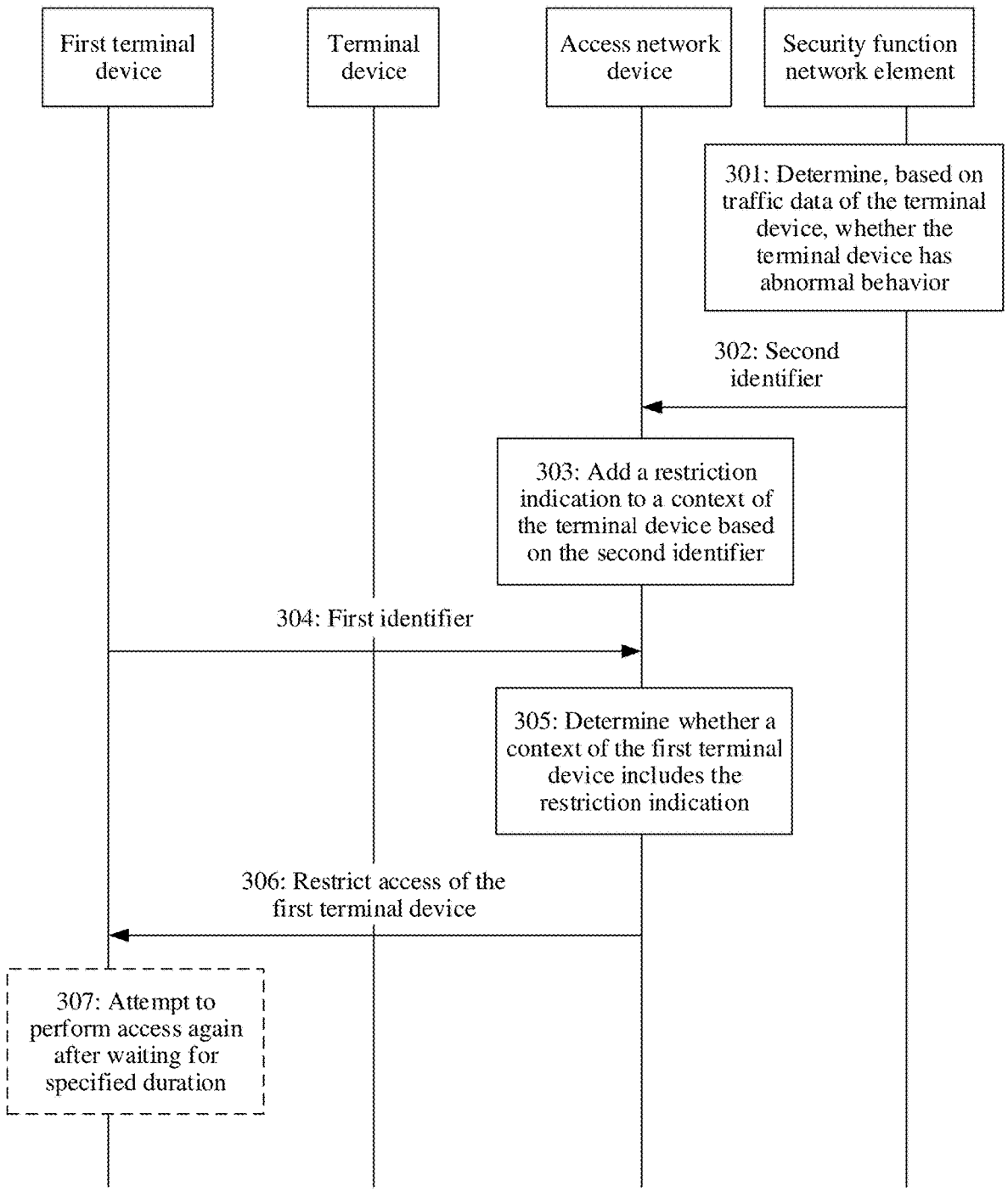
FIG. 3 is a flowchart of another method for restricting access of a terminal device according to this application.

FIG. 3 shows another method for restricting access of a terminal device according to this application. The method includes the following operations.

Operation 301 and operation 302 are the same as operation 201 and operation 202 in embodiment 2, and reference may be made to the foregoing description.

Operation 303: An access network device adds a restriction indication to a context of a terminal device based on a second identifier.

The terminal device herein may be a terminal device in an inactive state.

In this application, an embodiment of the second identifier may include but is not limited to the following embodiments:

In 4G, the second identifier may be an S-TMSI, a hash value of an S-TMSI, a GUTI, a hash value of a GUTI, an eNB UE S1AP ID, or an MME UE S1AP ID.

In 5G, the second identifier may be a 5G-S-TMSI, a hash value of a 5G-S-TMSI, a 5G-GUTI, a hash value of a 5G-GUTI, a gNB UE N2AP ID, or an AMF UE N2AP ID.

Certainly, in future communications, for example, the 6G communications, the second identifier may alternatively be another identifier. This is not limited in this application.

After receiving the second identifier, the access network device determines a context of the terminal device based on the second identifier, and then adds a restriction indication to the context of the terminal device, where the restriction indication is used to indicate that the terminal device is a terminal device whose access needs to be restricted.

By performing operation 301 to operation 303, a security function network element may determine terminal devices having abnormal behavior, and send second identifiers of the terminal devices to the access network device. The access network device separately adds the restriction indication to a terminal context of a corresponding terminal device based on the second identifiers, to indicate that the terminal device is a terminal device whose access needs to be restricted. Therefore, when a terminal device, for example, a first terminal device, subsequently requests to resume a connection to the access network device, the access network device may determine, based on the context of the first terminal device, whether the first terminal device is a terminal device whose access needs to be restricted, and determine, based on a determining result, whether to restrict access of the terminal device. In this way, access of a terminal device having abnormal behavior can be restricted.

The following describes in detail a process in which the first terminal device requests access. It should be noted that the context of the first terminal device herein may have the restriction indication (that is, the restriction indication added to the context in operation 301 to operation 303), or may not have the restriction indication.

Operation 304: The first terminal device sends a first identifier of the first terminal device to the access network device, where the first identifier is used to identify the first terminal device. Correspondingly, the access network device may receive the first identifier.

The terminal device herein may be a first terminal device in the inactive state.

In an embodiment, operation 304 may be implemented by using the following method: The first terminal device sends a request message to the access network device. The request message includes the first identifier of the first terminal device, and the request message is used to request to resume an RRC connection. The request message may also be referred to as a connection resume request message, or may have another name.

The first identifier herein may be, for example, the S-TMSI, the 5G-S-TMSI, the GUTI, the 5G-GUTI, or an inactive-radio network temporary identity (I-RNTI), or may be the hash value of the S-TMSI, the hash value of the 5G-S-TMSI, the hash value of the GUTI, the hash value of the 5G-GUTI, or a hash value of an I-RNTI.

Operation 305: The access network device determines whether the context of the first terminal device includes the restriction indication.

The access network device obtains the context of the first terminal device based on the first identifier, and determines whether the context includes the restriction indication.

If the context includes the restriction indication, it indicates that the first terminal device is a terminal device whose access needs to be restricted, and operation 306 is performed.

If the context does not include the restriction indication, it indicates that the first terminal is not a terminal device whose access needs to be restricted, that is, the first terminal device is a normal terminal device, and the access network device does not need to restrict access of the first terminal device. Therefore, a connection to the first terminal device may be established.

Operation 306 is the same as operation 206 in the embodiment shown in FIG. 2, and reference may be made to the foregoing description.

In an embodiment, after operation 306, the method may further include operation 307. Operation 307 is the same as operation 207 in the embodiment shown in FIG. 2, and reference may be made to the foregoing description.

According to the foregoing method, the access network device pre-records the restriction indication in a context of a terminal device having abnormal behavior. When there is a first terminal device sending the first identifier to the access network device to request to resume the connection, the access network device first determines, based on the first identifier, whether the context of the first terminal device includes the restriction indication. If the first terminal device includes the restriction indication, it indicates that the first terminal device is the terminal device having the abnormal behavior. Therefore, the access network device restricts the access of the first terminal device, so as to effectively control an attack from the terminal device.

In an embodiment, after adding the restriction indication to the context of the corresponding terminal device based on the second identifier, the access network device may further start a timer. The timer is specific to the terminal device identified by the second identifier. The timer is configured to indicate duration for restricting the terminal device identified by the second identifier.

In an embodiment, alternatively, after determining that the context of the first terminal device includes the restriction indication in operation 305, the access network device may start a timer for the first terminal device, where the timer is used to indicate duration for restricting the access of the first terminal device.

It should be noted that the duration of any one of the foregoing timers may be set by the access network device, or may be specified by the security function network element for the access network device. This is not limited in this application.

It may be understood that to implement the foregoing functions, each network element includes a corresponding hardware structure and/or software module for implementing each function. Persons of ordinary skill in the art should easily be aware that, in combination with the examples described in the embodiments disclosed in this specification, units and algorithms operations may be implemented by hardware or a combination of hardware and computer software in the present disclosure. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of the present disclosure.

Figure 4:
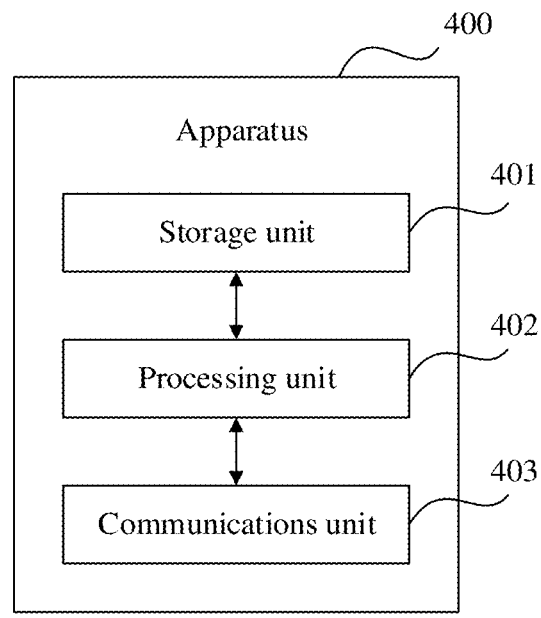
FIG. 4 is a schematic diagram of an apparatus according to this application.

When an integrated unit is used, FIG. 4 is a block diagram of an example of an apparatus according to an embodiment of the present disclosure. The apparatus 400 may exist in a form of software. The apparatus 400 may include a processing unit 402 and a communications unit 403. In an embodiment, the communications unit 403 may include a receiving unit and a sending unit. The processing unit 402 is configured to control and manage an action of the apparatus 400. The communications unit 403 is configured to support the apparatus 400 in communicating with another network entity. The apparatus 400 may further include a storage unit 401, configured to store program code and data of the apparatus 400.

The processing unit 402 may be a processor or a controller, for example, may be a general purpose central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing unit 402 may implement or execute various example logical blocks, modules, and circuits described with reference to content disclosed in the present disclosure. The processor may be a combination of processors implementing a computing function, for example, a combination including one or more microprocessors, or a combination of the DSP and a microprocessor. The communications unit 403 may be a communications interface, a transceiver, a transceiver circuit, or the like, where the communications interface is a general name, and may include a plurality of interfaces in some embodiments. The storage unit 401 may be a memory.

The apparatus 400 may be an access network device or a chip in an access network device. The processing unit 402 may support the apparatus 400 in performing actions of the access network device in the foregoing method examples. For example, the processing unit 402 is configured to support the apparatus 400 in performing operation 205 in FIG. 2, operation 303 and operation 305 in FIG. 3, and/or another process of the technology described in this specification. The communications unit 403 is configured to support the apparatus 400 in communicating with a security function network element and a terminal device. For example, the communications unit is configured to support the apparatus 400 in performing operation 202 to operation 204 and operation 206 in FIG. 2, and operation 302, operation 304, and operation 306 in FIG. 3.

Specifically, when the communications unit 403 includes the sending unit and the receiving unit, in an embodiment, the receiving unit is configured to receive a first identifier that is from a first terminal device, where the first identifier is used to identify the first terminal device. The processing unit is configured to: if the first identifier matches a second identifier, restrict access of the first terminal device, where the second identifier is used to identify a terminal device having abnormal behavior.

In an embodiment, the processing unit is further configured to perform matching between the first identifier and the second identifier.

In an embodiment, the processing unit is specifically configured to determine a third identifier of the terminal device based on the second identifier. The access network device performs matching between the first identifier and the third identifier.

In an embodiment, the processing unit is specifically configured to: determine a fourth identifier of the first terminal device based on the first identifier; and perform matching between the fourth identifier and the second identifier.

In an embodiment, the receiving unit is further configured to: before the processing unit performs matching between the first identifier and the second identifier, receive the second identifier that is from the security function network element.

In an embodiment, the processing unit is specifically configured to: start a timer after the receiving unit receives the second identifier that is from the security function network element; and if the timer does not time out, the access network device restricts the access of the first terminal device.

In an embodiment, the receiving unit is specifically configured to: receive a first message that is from the security function network element, where the first message includes the second identifier, and the first message is used to indicate that the terminal device is a terminal device whose access needs to be restricted; or receive the second identifier and indication information that are from the security function network element, where the indication information is used to indicate that the terminal device is a terminal device whose access needs to be restricted.

In an embodiment, the processing unit is further configured to: after the receiving unit receives the second identifier that is from the security function network element, and before the receiving unit receives the first identifier that is from the first terminal device, release a connection to the terminal device.

In an embodiment, the sending unit is configured to send a cause value to the first terminal device, where the cause value is used to indicate that a reason for restricting the access of the first terminal device is a security reason.

Specifically, when the communications unit 403 includes the sending unit and the receiving unit, in another embodiment, the receiving unit is configured to receive a first identifier that is from the terminal device, where the first identifier is used to identify the terminal device. The processing unit is configured to: obtain a context of the terminal device based on the first identifier; and if the context of the terminal device includes a restriction indication, restrict access of the terminal device, where the restriction indication is used to indicate that the terminal device is a terminal device whose access needs to be restricted.

In an embodiment, the receiving unit is further configured to receive a second identifier that is from the security function network element, where the second identifier is used to identify the terminal device having abnormal behavior. The processing unit is further configured to add the restriction indication to the context of the terminal device based on the second identifier.

In an embodiment, the processing unit is specifically configured to: start a timer after the receiving unit receives the second identifier that is from the security function network element; and if the timer does not time out, restrict the access of the terminal device.

In an embodiment, the receiving unit is specifically configured to: receive a first message that is from the security function network element, where the first message includes the second identifier, and the first message is used to indicate that the terminal device is a terminal device whose access needs to be restricted; or receive the second identifier and indication information that are from the security function network element, where the indication information is used to indicate that the terminal device is a terminal device whose access needs to be restricted.

In an embodiment, the sending unit is configured to send a cause value to the terminal device, where the cause value is used to indicate that a reason for restricting the access of the first terminal device is a security reason.

The apparatus 400 may alternatively be the security function network element or a chip in the security function network element in this application. The processing unit 402 may support the apparatus 400 in performing the actions of the security function network element in the foregoing method examples. For example, the processing unit 402 is configured to support the apparatus 400 in performing operation 201 in FIG. 2 and operation 301 in FIG. 3. The communications unit 403 may support the apparatus 400 in communicating with the access network device. For example, the communications unit 403 is configured to support the apparatus 400 in performing operation 203 and operation 206 in FIG. 2.

Specifically, when the communications unit 403 includes the sending unit and the receiving unit, in an embodiment, the processing unit is configured to determine, based on traffic data of the terminal device, that the terminal device has abnormal behavior. The sending unit is configured to send a second identifier of the terminal device to the access network device, where the second identifier is used to identify the terminal device.

In an embodiment, the sending unit is specifically configured to: send a first message to the access network device, where the first message includes the second identifier, and the first message is used to indicate that the terminal device is a terminal device whose access needs to be restricted; or send the second identifier and indication information to the access network device, where the indication information is used to indicate that the terminal device is a terminal device whose access needs to be restricted.

The apparatus 400 may alternatively the terminal device (or the first terminal device) or a chip in the terminal device (or the first terminal device) in this application. The processing unit 402 may support the apparatus 400 in performing actions of the terminal device (the first terminal device) in the foregoing method examples. For example, the processing unit 402 is configured to support the apparatus 400 in performing operation 207 in FIG. 2, operation 307 in FIG. 3, and/or another process of the technology described in this specification. The communications unit 403 may support the apparatus 400 in communicating with the access network device. For example, the communications unit 403 is configured to support the apparatus 400 in performing operation 203, and operation 204 to operation 206 in FIG. 2, and operation 304 and operation 306 in FIG. 3.

Specifically, when the communications unit 403 includes the sending unit and the receiving unit, in an embodiment, the sending unit is configured to send a first identifier of the terminal device to the access network device, where the first identifier is used to identify the terminal device.

The receiving unit is configured to receive a reject message that is from the access network device, where the reject message includes a cause value, and the cause value is used to indicate that a reason for restricting the access of the terminal device is a security reason.

In an embodiment, the processing unit is configured to attempt to perform access again after waiting for specified duration based on the cause value.

Figure 5:
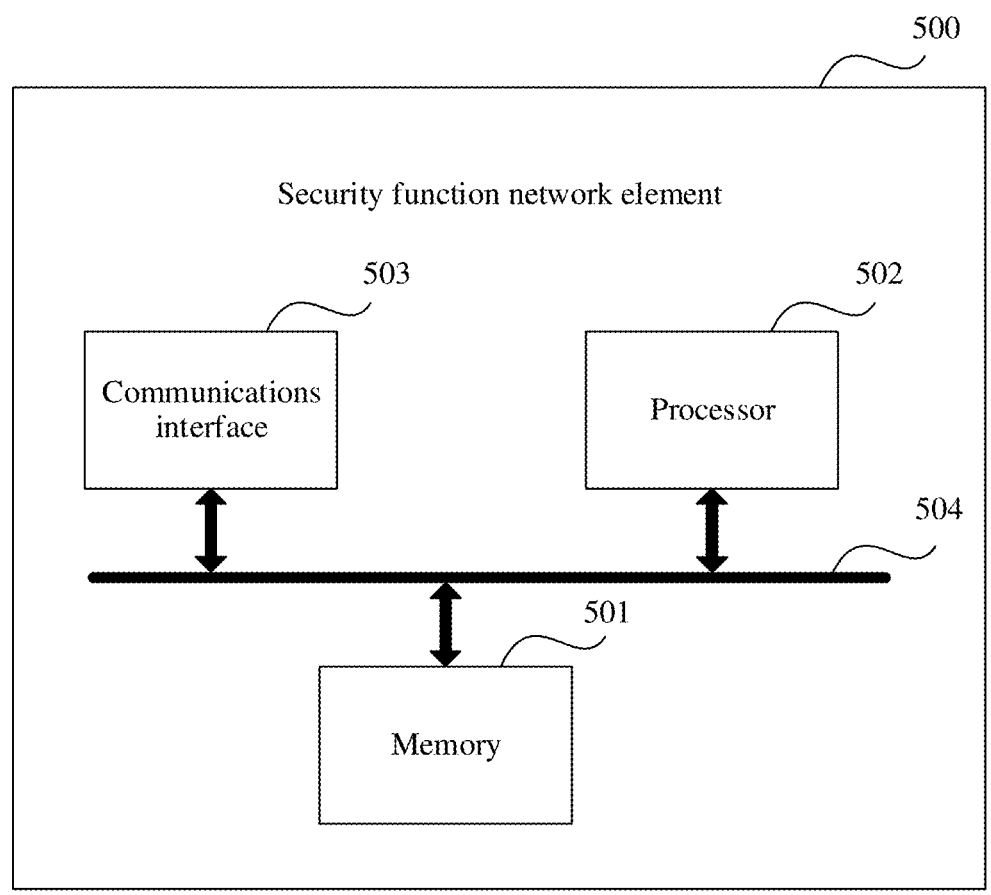
FIG. 5 is a schematic diagram of a security function network element according to this application.

FIG. 5 is a schematic diagram of an apparatus 500 according to this application. The apparatus may be the security function network element. The apparatus 500 includes a processor 502, a communications interface 503, and a memory 501. In an embodiment, the apparatus 500 may further include a communication line 504. The communications interface 503, the processor 502, and the memory 501 may be connected to each other through the communication line 504. The communication line 504 may be a peripheral component interconnect (peripheral component interconnect, PCI for short) bus, an extended industry standard architecture (extended industry standard architecture, EISA for short) bus, or the like. The communication line 504 may be classified into an address bus, a data bus, a control bus, and the like. For ease of representation, only one thick line is used to represent the bus in FIG. 5, but this does not mean that there is only one bus or only one type of bus.

The processor 502 may be a CPU, a microprocessor, an ASIC, or one or more integrated circuits configured to control program execution in the solutions of this application.

The communications interface 503 uses any apparatus like a transceiver, and is configured to communicate with another device or a communications network, such as the Ethernet, a radio access network (RAN), a wireless local area network (WLAN), or a wired access network.

The memory 501 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor through the communication line 504. The memory may alternatively be integrated with the processor.

The memory 501 is configured to store a computer executable instruction for executing the solutions in this application, and the processor 502 controls the execution. The processor 502 is configured to execute the computer executable instruction stored in the memory 501, to implement the method for restricting access of the terminal device provided in the foregoing embodiment of this application.

In an embodiment, the computer executable instruction in this embodiment of this application may also be referred to as application program code. This is not specifically limited in this embodiment of this application.

Figure 6:
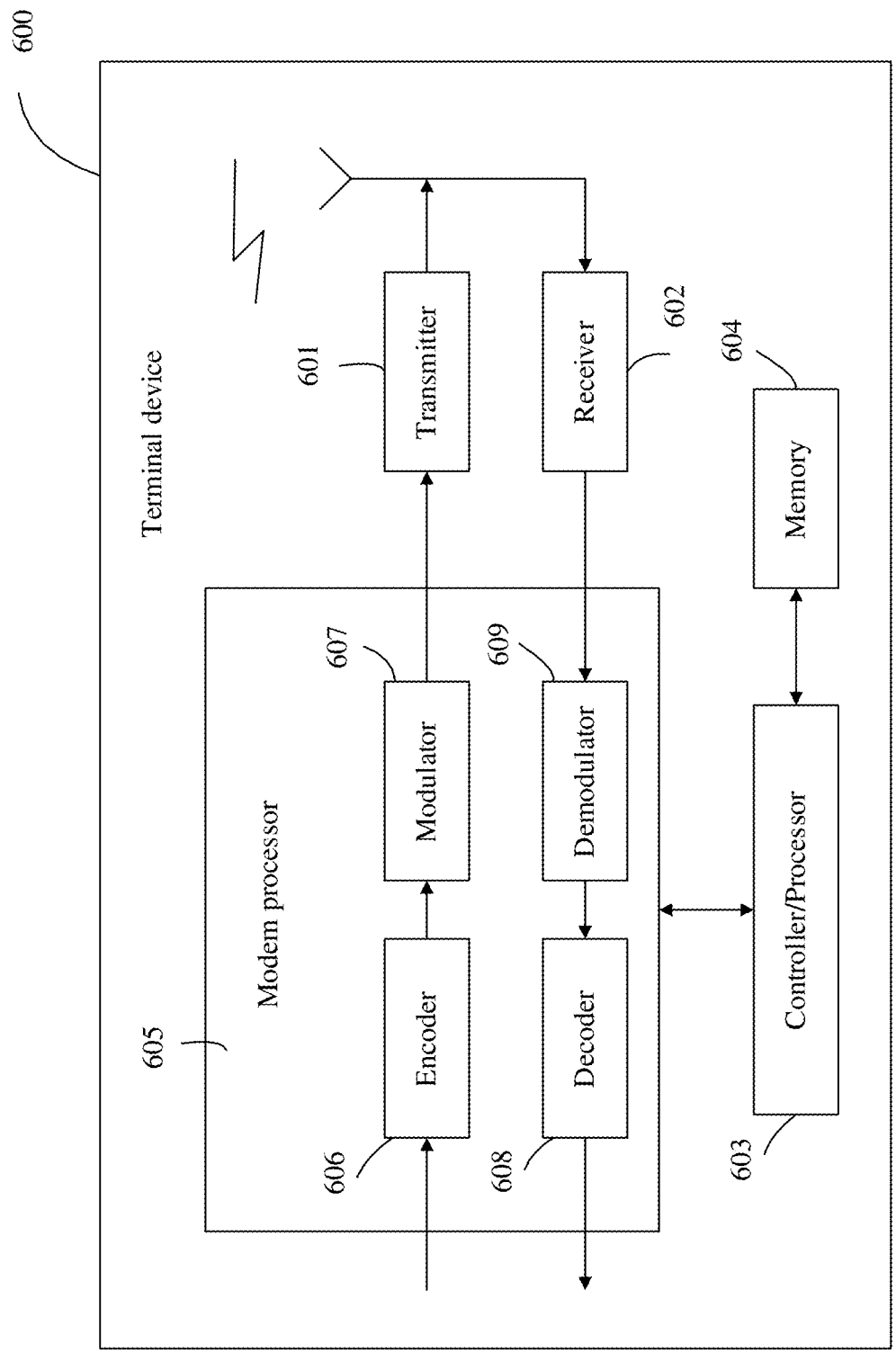
FIG. 6 is a schematic diagram of a terminal device according to this application.

FIG. 6 is a simplified schematic diagram of a designed structure of a terminal device according to an embodiment of the present disclosure. The terminal 600 includes a transmitter 601, a receiver 602, and a processor 603. The processor 603 may also be a controller, and is represented as the "controller/processor 603" in FIG. 6. In an embodiment, the terminal 600 may further include a modem processor 605. The modem processor 605 may include an encoder 606, a modulator 607, a decoder 608, and a demodulator 609.

In an example, the transmitter 601 adjusts (for example, through analog conversion, filtering, amplification, and up-conversion) an output sample and generates an uplink signal. The uplink signal is transmitted to the access network device in the foregoing embodiment through an antenna. On a downlink, the antenna receives a downlink signal transmitted by the access network device in the foregoing embodiment. The receiver 602 adjusts (for example, through filtering, amplification, down-conversion, and digitization) a signal received from the antenna and provides an input sample. In the modem processor 605, the encoder 606 receives service data and a signaling message that are to be sent on an uplink, and processes (for example, formats, encodes, and interleaves) the service data and the signaling message. The modulator 607 further processes (such as through symbol mapping and modulation) encoded service data and an encoded signaling message, and provides an output sample. The demodulator 609 processes (for example, demodulates) the input sample and provides symbol estimation. The decoder 608 processes (for example, de-interleaves and decodes) the symbol estimation and provides the decoded data and signaling message that are to be sent to the terminal 600. The encoder 606, the modulator 607, the demodulator 609, and the decoder 608 may be implemented by the combined modem processor 605. The units process based on a radio access technology (for example, an access technology of an LTE or another evolution system) used by a radio access network. It should be noted that when the terminal 600 does not include the modem processor 605, the foregoing functions of the modem processor 605 may also be implemented by the processor 603.

The processor 603 controls and manages actions of the terminal device 600, and is configured to perform a processing process performed by the terminal device 600 in the foregoing embodiments of the present disclosure. For example, the processor 603 is further configured to perform the processing processes of the terminal device (or the first terminal device) in the method shown in FIG. 2 and FIG. 3 and/or another process of the technical solutions described in this application.

Further, the terminal device 600 may further include a memory 604, and the memory 604 is configured to store program code and data of the terminal device 600.

Figure 7:
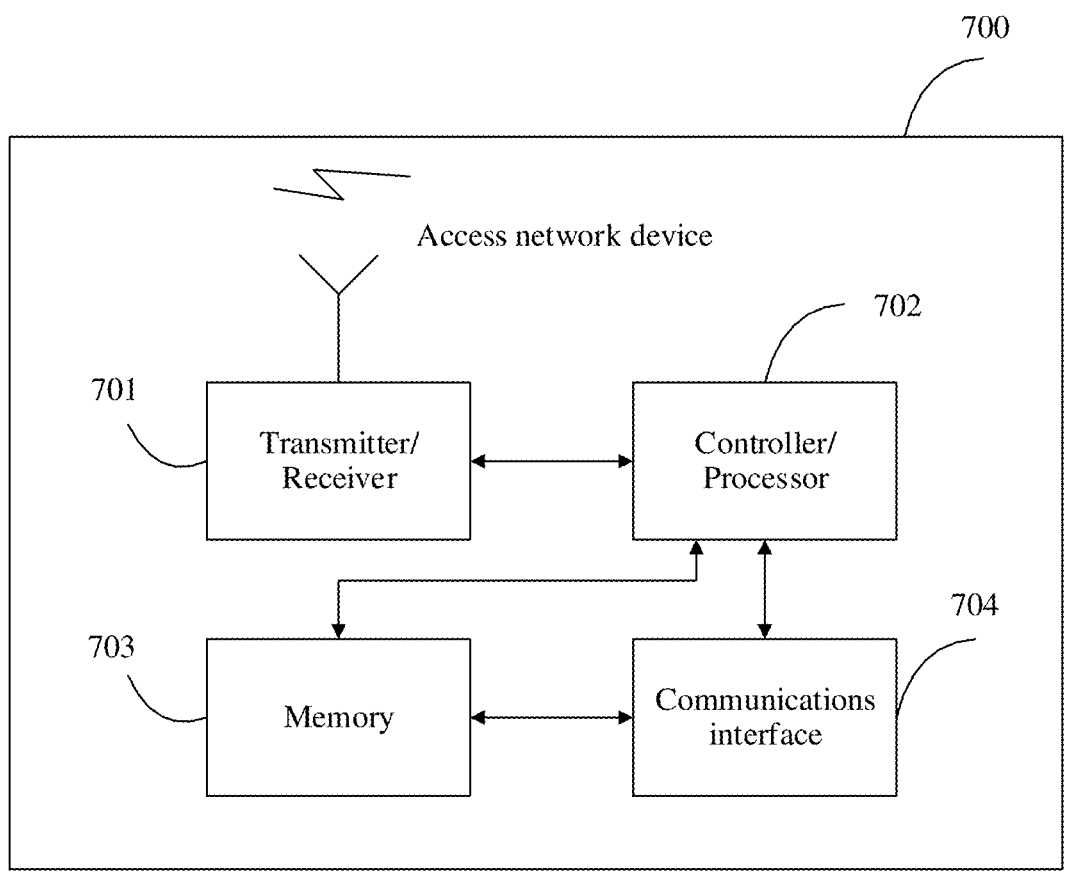
FIG. 7 is a schematic diagram of an access network device according to this application.

FIG. 7 is a schematic structural diagram of an access network device 700 according to an embodiment of the present disclosure. The access network device 700 includes a processor 702 and a communications interface 704. The processor 702 may also be a controller, and is represented as the "controller/processor 702" in FIG. 7. The communications interface 704 is configured to support the access network device in communicating with another network element (for example, a security function network element). Further, the access network device 700 may further include a transmitter/receiver 701. The transmitter/receiver 701 is configured to support radio communication between the access network device and the terminal device (or the first terminal device) in the foregoing embodiments. The processor 702 may perform various functions for communicating with the terminal device (or the first terminal device). In an uplink, an uplink signal that is from the terminal device (or the first terminal device) is received through an antenna, is demodulated (for example, a high frequency signal is demodulated into a baseband signal) by the receiver 701, and is further processed by the processor 702 to recover service data and signaling information that are sent by the terminal device (or the first terminal device). In a downlink, service data and a signaling message are processed by the processor 702, and are modulated (for example, a baseband signal is modulated into a high frequency signal) by the transmitter 701 to generate a downlink signal, and the downlink signal is transmitted to the terminal device (or the first terminal device) through an antenna. It should be noted that the foregoing demodulation or modulation function may also be implemented by the processor 702.

For example, the processor 702 is further configured to perform the processing processes of the access network device in the method shown in FIG. 2 and FIG. 3 and/or another process of the technical solutions described in this application.

Further, the access network device 700 may further include a memory 703, and the memory 703 is configured to store program code and data of the access network device 700.

It may be understood that, FIG. 7 shows only a simplified design of the access network device 700. In an embodiment, the access network device 700 may include any quantity of transmitters, receivers, processors, controllers, memories, communications units, and the like, and all access network devices that can implement the embodiments of the present disclosure fall within the protection scope of the embodiments of the present disclosure.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. In an embodiment, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Operations of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. In an embodiment, the storage medium may be further integrated into the processor. The processor and the storage medium may be disposed in an ASIC, and the ASIC may be disposed in a terminal device. In an embodiment, the processor and the storage medium may be alternatively disposed in different components of the terminal device.

The computer program instructions may alternatively be loaded onto a computer or another programmable data processing device, so that a series of operations are performed on the computer or the another programmable device, to generate computer-implemented processing. Therefore, the instructions executed on the computer or the another programmable device provide operations for implementing a specific function in one or more procedures in the flowcharts and/or in one or more blocks in the block diagrams.

Although this application is described with reference to specific features and the embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clear that persons skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A method for restricting access of a terminal device to a network, comprising:
   receiving, by an access network device, a second identifier from a security function network element, wherein the second identifier is used to identify a terminal device having one or more abnormal behaviors;
   adding, by the access network device when the terminal device is in an inactive state, a restriction indication to an access stratum context of the terminal device being in the inactive state based on the second identifier, wherein the access stratum context of the terminal device being in the inactive state is a part of an access stratum context of the terminal device being in a connected state, wherein the restriction indication is used to indicate that the terminal device is a terminal device whose access needs to be restricted;
   receiving, by the access network device, a request message from the terminal device, wherein the request message is used to request resume a radio resource control (RRC) connection and includes a first identifier, wherein the first identifier is used to identify the terminal device, wherein the first identifier is an inactive-radio network temporary identity (I-RNTI);
   obtaining, by the access network device, the access stratum context of the terminal device being in the inactive state based on the first identifier; and
   in response to determining that the access stratum context of the terminal device comprises the restriction indication, sending, by the access network device, a cause value to the terminal device, wherein the cause value indicates to access the network again after waiting for a specified duration.

2. The method according to claim 1, wherein after the receiving, by the access network device, the second identifier that is from the security function network element, the method further comprising:
   starting, by the access network device, a timer; and
   restricting, by the access network device, the access of the terminal device for a duration of the timer.

3. The method according to claim 1, wherein the receiving the second identifier from the security function network element comprises:
   receiving, by the access network device, a first message from the security function network element, wherein the first message comprises the second identifier, and the first message is used to indicate that the terminal device is a terminal device whose access needs to be restricted; or
   receiving, by the access network device, the second identifier and indication information that are from the security function network element, wherein the indication information is used to indicate that the terminal device is a terminal device whose access needs to be restricted.

4. The method according to claim 1,
   wherein the cause value further indicates that a reason for restricting the access of the terminal device is a security reason.

5. An apparatus, comprising:
   a receiver;
   a transmitter;
   a processor;

wherein the receiver is configured to receive a second identifier from a security function network element of a network, wherein the second identifier is used to identify a terminal device having one or more abnormal behaviors;

wherein the processor is configured to add a restriction indication to an access stratum context of the terminal device based on the second identifier when the terminal device is in an inactive state, wherein the access stratum context of the terminal device being in the inactive state is a part of an access stratum context of the terminal device being in a connected state, wherein the restriction indication is used to indicate that the terminal device is a terminal device whose access needs to be restricted;

wherein the receiver is configured to receive a request message from the terminal device, wherein the request message is used to request resume a radio resource control (RRC) connection and includes a first identifier from a terminal device, wherein the first identifier is used to identify the terminal device, wherein the first identifier is an inactive-radio network temporary identity (I-RNTI);

wherein the processor is configured to:
obtain the access stratum context of the terminal device being in the inactive state based on the first identifier, and
when the access stratum context of the terminal device comprises the restriction indication, send, via the transmitter, a cause value to the terminal device, wherein the cause value indicates to access the network again after waiting for a specified duration.

6. The apparatus according to claim 5, wherein the processor is configured to:
start a timer after the receiver receives the second identifier from the security function network element after the receiving the second identifier that is from the security function network element; and
when the timer does not time out, restrict the access of the terminal device.

7. The apparatus according to claim 5, wherein the receiver is further configured to:
receive a first message from the security function network element, wherein the first message comprises the second identifier, and the first message is used to indicate that the terminal device is a terminal device whose access needs to be restricted; or
receive the second identifier and indication information from the security function network element, wherein the indication information is used to indicate that the terminal device is a terminal device whose access needs to be restricted.

8. The apparatus according to claim 5, wherein the cause value further indicates that a reason for restricting the access of the terminal device is a security reason.

9. The method according to claim 1, wherein the access stratum context is reserved after the access network device suspends the terminal device.

10. The method according to claim 1, wherein the one or more abnormal behaviors includes one or more of a signaling anomaly, a traffic anomaly, or a service anomaly that occurs on the terminal device.

11. The apparatus according to claim 5, wherein the one or more abnormal behaviors includes one or more of a signaling anomaly, a traffic anomaly, or a service anomaly that occurs on the terminal device.

12. A non-transitory computer readable medium that stores program instructions for restricting access of a terminal device to a network, wherein the program instructions, when executed by a processor of an access network device in the network, cause the access network device to perform operations comprising:
receiving a second identifier from a security function network element, wherein the second identifier is used to identify a terminal device having one or more abnormal behaviors;
adding a restriction indication to an access stratum context of the terminal device based on the second identifier when the terminal device is in an inactive state, wherein the access stratum context of the terminal device being in the inactive state is a part of an access stratum context of the terminal device being in a connected state, wherein the restriction indication is used to indicate that the terminal device is a terminal device whose access needs to be restricted;
receiving request message from the terminal device, wherein the request message is used to request resume a radio resource control (RRC) connection and includes a first identifier from the terminal device, wherein the first identifier is used to identify the terminal device, wherein the first identifier is an inactive-radio network temporary identity (I-RNTI);
obtaining the access stratum context of the terminal device being in the inactive state based on the first identifier; and
in response to determining that the access stratum context of the terminal device comprises the restriction indication, sending a cause value to the terminal device, wherein the cause value indicates to access the network again after waiting for a specified duration.

13. The non-transitory computer readable medium according to claim 12, wherein the operations further comprising:
after the receiving, by the access network device, the second identifier that is from the security function network element, starting, by the access network device, a timer; and
restricting, by the access network device, the access of the terminal device for a duration of the timer.

14. The non-transitory computer readable medium according to claim 12, wherein the receiving the second identifier from the security function network element comprises:
receiving, by the access network device, a first message from the security function network element, wherein the first message comprises the second identifier, and the first message is used to indicate that the terminal device is a terminal device whose access needs to be restricted; or
receiving, by the access network device, the second identifier and indication information that are from the security function network element, wherein the indication information is used to indicate that the terminal device is a terminal device whose access needs to be restricted.

15. The non-transitory computer readable medium according to claim 12, wherein the cause value further indicates that a reason for restricting the access of the terminal device is a security reason.

16. The method according to claim 1, wherein the second identifier is a 5G-S-TMSI, a hash value of a $5^{th}$ generation system architecture evolution temporary mobile station identifier (5G-S-TMSI), a $5^{th}$ generation globally unique temporary identity (5G-GUTI), a hash value of a 5G-GUTI, a next generation NodeB (gNB) UE N2 application protocol (N2AP) ID, or an access and mobility management function (AMF) UE N2AP ID.

17. The method according to claim 1, wherein the access stratum context of the terminal device changes according to a state of the terminal device.

18. The apparatus according to claim 5, wherein the second identifier is a 5G-S-TMSI, a hash value of a $5^{th}$ generation system architecture evolution temporary mobile station identifier (5G-S-TMSI), a $5^{th}$ generation globally unique temporary identity (5G-GUTI), a hash value of a 5G-GUTI, a next generation NodeB (gNB) UE N2 application protocol (N2AP) ID, or an access and mobility management function (AMF) UE N2AP ID.

19. The apparatus according to claim 5, wherein the access stratum context of the terminal device changes according to a state of the terminal device.

20. The non-transitory computer readable medium according to claim 12, wherein the second identifier is a 5G-S-TMSI, a hash value of a $5^{th}$ generation system architecture evolution temporary mobile station identifier (5G-S-TMSI), a $5^{th}$ generation globally unique temporary identity (5G-GUTI), a hash value of a 5G-GUTI, a next generation NodeB (gNB) UE N2 application protocol (N2AP) ID, or an access and mobility management function (AMF) UE N2AP ID.

* * * * *